United States Patent [19]

Nigrin

[11] Patent Number: 4,590,171
[45] Date of Patent: May 20, 1986

[54] LOW TEMPERATURE LEAD AND CADMIUM-FREE FRITS

[75] Inventor: Jaroslava M. Nigrin, Corning, N.Y.

[73] Assignee: Corning Glass Works, Corning, N.Y.

[21] Appl. No.: 738,860

[22] Filed: May 29, 1985

[51] Int. Cl.$^4$ .......................... C03C 8/06; C03C 8/04; C03C 3/118; C03C 3/093
[52] U.S. Cl. ........................................ 501/25; 501/21; 501/26; 501/59; 501/67
[58] Field of Search ....................... 501/21, 25, 26, 59, 501/67

[56] References Cited

U.S. PATENT DOCUMENTS

| | | | |
|---|---|---|---|
| 4,282,035 | 8/1981 | Nigrin | 501/32 |
| 4,285,731 | 8/1981 | Nigrin | 501/26 |
| 4,311,504 | 1/1982 | Nigrin | 501/25 |
| 4,316,963 | 2/1982 | Hommel et al. | 501/21 |
| 4,340,645 | 7/1982 | O'Conor | 501/26 |
| 4,376,169 | 3/1983 | Eppler | 501/26 |
| 4,417,913 | 11/1983 | Davis et al. | 501/26 |

*Primary Examiner*—Mark L. Bell
*Attorney, Agent, or Firm*—C. S. Janes, Jr.

[57] ABSTRACT

This invention relates to the production of frits especially suitable for use in contact with foods. The frits are essentially free from cadmium and lead and consist essentially, in weight percent on the oxide basis, of:

$Li_2O$: 3–4
$Na_2O$: 0.75–3
$BaO$: 3.5–9.5
$B_2O_3$: 14–17.5
$Al_2O_3$: 6.75–8.75
$SiO_2$: 48–55
$ZrO_2$: 6.75–10.5
F: 3–4.

2 Claims, No Drawings

LOW TEMPERATURE LEAD AND CADMIUM-FREE FRITS

BACKGROUND OF THE INVENTION

U.S. Pat. No. 4,285,731 discusses the hazards of lead and cadmium release from glazes and enamels containing those components and discloses frit compositions which are substantially free from those materials. Those frits consisted essentially, in weight percent on the oxide basis, of:

$SiO_2$: 35–47
$B_2O_3$: 5.5–9
BaO: 24–42
$TiO_2$: 1.5–4
$ZrO_2$: 6–10
$Li_2O$: 1–5
SrO: 0–8
MgO: 0–5
CaO: 0–4
ZnO: 0–10
$Bi_2O_3$: 0–8
$SrO+MgO+CaO+ZnO+Bi_2O_3$: 0–10.

As is employed generally in the ceramic art and as used herein, glazes are deemed to be transparent glasses which may be colored, and enamels as glazes containing particles of pigments to provide color thereto. Both types of products are applied to the surface of a glass, glass-ceramic, or sintered ceramic body which is to be decorated in the form of very finely-divided particles, conventionally termed "frit", and that powder then fired to fuse to and form a strongly-bonded, continuous film on the surface of the body.

The above frits exhibited a coefficient of thermal expansion (20°–300° C.) between about $65-75\times10^{-7}/°C.$, a viscosity suitable for firing at about 700°–950° C., and excellent resistance to attack by acids and bases. That patent also recited four criteria which must necessarily be demonstrated by glazes and enamels, and referred to an optional characteristic demanded when a transparent, highly glossy decorative coating is desired.

First, the firing or maturing temperature of the frit, i.e., the temperature at which the frit will flow sufficiently to form a smooth uniform coating, must be low enough to forestall thermal deformation of the substrate being coated.

Second, the coefficient of thermal expansion of the frit must be compatible with that of the ware being coated to preclude crazing and/or spalling; the most advantageous frits having coefficients of thermal expansion somewhat lower than that of the substrate such that, when the ware is cooled to room temperature, the fired coating will form a surface compression layer.

Third, the frit must manifest excellent resistance to attack by acids and bases since corrosion of the coating can result in the loss of gloss, the development of haze and/or iridescence, the formation of porosity, or other defects deleterious to the appearance or physical character of the coating.

Fourth, the frit must maintain good glass stability; i.e., the frit must not devitrify to any substantial extent during the maturing firing.

Fifth, where a glossy appearance is desired, the refractive index of the frit must be high.

Where the glazes or enamels are to be utilized in food service applications, such as culinary ware and tableware, they must resist attack by acids present in foods and alkalies present in detergents employed in dishwashers. The extreme toxicity of certain heavy metals, notably lead and cadmium, has been recognized by the Food and Drug Administration (FDA). Hence, in its Compliance Guidance Manual, issued June 13, 1974, that agency established maxima for cadmium and lead release which food-containing surfaces must not exceed.

However, as was pointed out in U.S. Pat. No. 4,285,731, PbO and CdO serve two very useful functions in glazes; viz., to soften the frit (lower its melting point), and to raise the refractive index of the frit. Accordingly, the removal of PbO and/or CdO from a frit to eliminate the potential for CdO and/or PbO toxicity must be undertaken with due regard to satisfying the above criteria for enamels and glazes.

U.S. Pat. No. 4,282,035 also describes lead and cadmium-free frits, those frits exhibiting coefficients of thermal expansion (20°–300° C.) between about $52-65\times10^{-7}/°C.$, maturing temperatures of about 850°–1100° C., excellent resistance to attack by acids and alkalies, and consisting essentially, in weight and the oxide basis, of:

$SiO_2$: 51–60
$B_2O_3$: 4.5–8
BaO: 0–13
SrO: 0–18
BaO+SrO: 6–30
$ZrO_2$: 4–8
$Al_2O_3$: 5–8
$Li_2O$: 0–4
$Na_2O$: 0–5
$K_2O$: 0–5
$Li_2O+Na_2O+K_2O$: 1–5
MgO: 0–6
CaO: 0–12
$Bi_2O_3$: 0–10
$MgO+CaO+Bi_2O_3$: 0–20.

U.S. Pat. No. 4,311,504 discloses applying a mixture of a frit having a composition within the ranges set forth in U.S. Pat. No. 4,285,731 and cadmium sulfoselenide onto the surface of a glass, glass-ceramic, or sintered ceramic body and firing the body at about 700°–950° C. in a non-oxidizing or inert environment to produce a bright red coating.

SUMMARY OF THE INVENTION

The primary objective of the present invention is to prepare glazes and enamels having lower maturing temperatures than U.S. Pat. Nos. 4,282,035 and 4,285,731, while still retaining the low coefficient of thermal expansion, the excellent resistance to attack by acids and alkalies, the good glass stability, and the high glossy appearance displayed by the products of those patents.

A second objective is to prepare glazes and enamels demonstrating those characteristics which, when used with standard cadmium-containing pigments, exhibit very low cadmium release when contacted with acids and alkalies.

A third objective is to prepare glazes and enamels displaying the above characteristics which do not require any special firing environment to obtain a bright red-coating with cadmium sulfoselenide pigments.

I have found that frits can be produced exhibiting softening points between about 600°–625° C., coefficients of thermal expansion (20°–300° C.) between about $57-62\times10^{-7}/°C$., excellent chemical durability, good glass stability, and high gloss from alkali barium aluminoborofluorosilicate base compositions consisting essentially, expressed in terms of weight percent on the oxide basis, of about:

$Li_2O$: 3–4
$Na_2O$: 0.75–3
$BaO$: 3.5–9.5
$B_2O_3$: 14–17.5
$Al_2O_3$: 6.75–8.75
$SiO_2$: 48–55
$ZrO_2$: 6.75–10.5
F: 3–4.

Various compatible metal oxides may optionally be included in the base composition to modify the properties thereof. The total of all those additions, however, will be maintained below about 7.5% in order to insure retention of the desired characteristics in the inventive glazes and enamels. Illustrative of such metal oxides are 0–3% $Bi_2O_3$, 0–1.5% CaO, 0–2% $K_2O$, 0–5% $Sb_2O_3$, 0–2% $SnO_2$, 0–2% SrO, 0–3% $TiO_2$, and 0–2.5% ZnO.

Inasmuch as the potentially toxic heavy metals cadmium and lead comprise no part of the inventive frits, the resultant glazes can be employed without concern in contact with foods. $ZrO_2$ and $TiO_2$, when present, confer good chemical durability and a high index of refraction to the frits. $ZrO_2$, however, raises the softening point and the viscosity of the frits, so requires extensive adjustments to be made to the other components to obtain the desired combination of other parameters, notably glass stability and low maturing temperature. BaO exerts a very positive effect upon the glass stability and refractive index of the frits. Thus, BaO in conjunction with $ZrO_2$ (and $TiO_2$) acts to provide the desired high gloss. The alkali metals and fluoride tend to soften the frits and reduce their viscosity.

It will be appreciated that colorants and pigments can be dissolved and/or suspended in the frits to yield colored glazes or enamels. The colorants and pigments most widely used commercially have been the transition metal oxides such as, for example, CoO, $Cr_2O_3$, $Fe_2O_3$, $MnO_2$, $NiO_2$, and $V_2O_5$, and certain rare earths, notably erbium, neodymium, and praeseodymium. In general, the total pigment content will constitute less than 20% by weight and, quite frequently, less than 5%.

Finally, a bright red or yellow color can be produced with the inventive frits when blended with about 2–10% by weight cadmium sulfoselenide and fired in an oxidizing, non-oxidizing, or inert atmosphere.

PRIOR ART

U.S. Pat. No. 4,084,976 is drawn to lead and cadmium-free glazes stated to be useful with alumina bodies, those glazes consisting essentially, in weight percent, of:

$SiO_2$: 50–54
$Al_2O_3$: 5–8
$B_2O_3$: 6–12
CaO: 4–6
$Li_2O+Na_2O+K_2O$: 4–6
MgO: 2–8
BaO: 2–5
SrO: 5–8
ZnO: 1–2.

Such compositions are self-evidently far removed from those of the present inventive frits.

U.S. Pat. No. 4,120,733 is also directed to lead and cadmium-free glazes stated to be operable with alumina bodies, the glazes being asserted to be an improvement upon the products of U.S. Pat. No. 4,084,976 in having maturing temperatures about 80°–100° F. lower. The glazes consisted essentially, in weight percent, of:

$SiO_2$: 48–54
$Al_2O_3$: 7–11
$B_2O_3$: 16.5–20
BaO: 11–14
CaO: 2–3
ZnO: 2–2.5
$Na_2O$: 4.25–5.25
$K_2O$: 0.4–1.

Again, those compositions are quite far outside the operable ranges of the present inventive frits.

U.S. Pat. No. 4,224,074 likewise describes frits useful for decorating food service ware, the frits being lead and cadmium-free, exhibiting coefficients of expansion (20°–300° C.) between about $50-110\times10^{-7}/°C$. and a viscosity suitable for firing at about 650°–775° C., and consisting essentially, in weight percent, of:

$SiO_2$: 29–55
$B_2O_3$: 7–31
$Al_2O_3$: 2–8
$ZrO_2$: 5–16
$Na_2O$: 4–20
$Li_2O$: 0–7
$Na_2O+Li_2O$: 6–24
F: 0.75–4.

The absence of any alkaline earth oxide and the requirement of a high alkali oxide content place those frits outside the purview of the present inventive compositions.

DESCRIPTION OF PREFERRED EMBODIMENTS

The table below records a group of frit compositions, expressed in terms of parts by weight on the oxide basis, illustrating the present invention. Because the sum of the individual constituents totals or closely approximates 100, for all practical purposes the reported values may be deemed to reflect weight percent. Furthermore, inasmuch as it is not known with which cation(s) the fluoride is combined and the amount thereof is relatively small, it is merely tabulated as fluoride, in accordance with conventional glass analysis practice. Finally, the actual batch ingredients may be any materials, either the oxide or other compound, which, when melted together, will be converted into the desired oxide in the proper proportions. The fluoride will typically be added as an alkali metal fluoride or silicofluoride.

The batch components were compounded, ballmilled together to assist in securing a homogeneous melt, charged into platinum crucibles, and the crucibles introduced into a furnace operating at about 1300° C. After melting for about 3 hours, one portion of the melt was poured into a steel mold to form a glass slab having the dimensions of about $3''\times3''\times0.5''$ and that slab was transferred immediately to an annealer operating at about 450° C. The remainder of the melt was poured as a fine stream into a bath of water (drigaged) to produce finely-divided glass particles which, after drying, were ballmilled to pass a No. 325 United States Standard Sieve (44 microns).

The following table also recites the softening point (Soft.) in °C. and the coefficient of thermal expansion (Exp.) over the interval 20°–300° C. expressed in terms of $\times10^{-7}/°C$., as determined in accordance with measuring techniques standard in the glass art on the above-described annealed slabs.

As was described above, the dried drigaged glass particles were milled to a very finely-divided powder. That powder was hand pressed into a cylindrical shape having a height of about 0.5" and a diameter of about 0.5". Each cylinder was introduced into an electrically-fired furnace operating at 775° C., held at that temperature for about five minutes, and thereafter withdrawn from the furnace into the ambient environment to cool.

Minn., under the mark Super Soilax. After an immersion of 24 hours, the samples were withdrawn from the bath and inspected visually to observe any change in gloss employing the above-defined rating system.

The table below also records the visual qualitative assessments of the quality of the gloss exhibited by the buttons after immersions in the acid and alkali baths utilizing the above-described rating system.

TABLE

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $Li_2O$ | 3.48 | 3.48 | 3.72 | 3.77 | 3.68 | 3.41 | 3.46 | 3.35 | 3.41 | 3.37 | 3.30 | 3.24 | 3.52 | 3.40 | 3.46 | 3.52 | 3.42 | 3.39 | 3.51 |
| $Na_2O$ | 2.69 | 2.66 | 2.70 | 2.73 | 2.67 | 2.61 | 2.66 | 2.58 | 2.62 | 2.59 | 2.54 | 2.49 | 2.71 | 2.65 | 2.66 | 2.71 | 2.63 | 2.61 | 2.70 |
| ZnO | | | | | | | 1.53 | 1.49 | — | — | — | — | — | — | 1.53 | 1.56 | 1.52 | 1.50 | |
| $K_2O$ | | | | | | | | | | | | | | | | | | | — |
| CaO | 1.04 | 1.04 | 1.06 | 1.07 | 1.05 | 1.02 | 1.04 | 1.01 | 1.03 | 1.02 | 1.00 | 0.98 | 1.06 | — | — | — | — | — | — |
| SrO | | | | | | | | | | | | | 2.68 | 1.98 | — | — | — | — | — |
| BaO | 7.72 | 7.71 | 7.67 | 7.77 | 7.60 | 7.56 | 6.64 | 7.33 | 7.55 | 7.36 | 7.22 | 7.08 | 3.92 | 7.56 | 7.67 | 7.70 | 8.48 | 9.39 | 7.79 |
| $B_2O_3$ | 16.67 | 16.65 | 15.61 | 14.56 | 15.45 | 16.31 | 16.59 | 16.07 | 16.34 | 16.15 | 15.84 | 15.53 | 16.87 | 16.53 | 16.59 | 16.90 | 16.42 | 16.25 | 16.85 |
| $SiO_2$ | 52.61 | 50.55 | 53.08 | 53.75 | 52.54 | 51.48 | 52.29 | 50.67 | 51.51 | 50.92 | 49.93 | 48.97 | 53.19 | 52.10 | 52.30 | 51.39 | 51.75 | 51.23 | 53.11 |
| $Al_2O_3$ | 7.33 | 7.39 | 7.49 | 7.58 | 8.44 | 7.24 | 7.38 | 7.15 | 7.27 | 7.18 | 7.04 | 6.91 | 7.50 | 7.35 | 7.38 | 7.51 | 7.30 | 7.23 | 7.49 |
| $ZrO_2$ | 8.36 | 10.42 | 8.42 | 8.33 | 8.34 | 8.18 | 8.30 | 8.04 | 8.17 | 8.08 | 7.92 | 7.77 | 8.44 | 8.27 | 8.30 | 8.45 | 8.21 | 8.13 | 8.43 |
| $TiO_2$ | — | — | — | — | — | 2.14 | — | 2.11 | — | 2.12 | 2.08 | 2.04 | | | | | | | — |
| F | 3.74 | 3.73 | 3.77 | 3.81 | 3.73 | 3.66 | 3.71 | 3.59 | 3.65 | 3.61 | 3.54 | 3.47 | 3.77 | 3.69 | 3.71 | 3.78 | 3.67 | 3.63 | 3.77 |
| $Sb_2O_3$ | | | | | | | — | — | — | 0.99 | 2.92 | 4.77 | | | | | | | |
| $Bi_2O_3$ | | | | | | | — | — | 2.00 | — | — | — | | | | | | | |
| Soft | 616 | 620 | 620 | 621 | 620 | 617 | 615 | 616 | 616 | 621 | 617 | 612 | 623 | 620 | 614 | 610 | 615 | 609 | 615 |
| Exp. | 59.1 | 60.1 | 59.0 | 59.7 | 59.0 | 59.4 | 59.0 | 58.8 | 59.9 | 59.9 | 60.7 | 60.8 | 58.8 | 59.7 | 58.7 | 59.0 | 58.8 | 59.5 | 58.1 |
| Acid | 2 | 2 | 1 | 1 | 2 | 2 | 2 | 1 | 2 | 1 | 1 | 1 | 2 | 1 | 2 | 2 | 2 | 2 | 2 |
| Alkali | 1 | 1 | 1 | 1 | 1 | 1 | 1 | 1 | 1 | 1 | 1 | 1 | 1 | 1 | 1 | 1 | 1 | 1 | 1 |

| | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| $Li_2O$ | 3.51 | 3.44 | 3.34 | 3.27 | 3.40 | 3.48 | 3.40 | 3.56 | 3.44 | 3.37 | 3.57 | 3.48 | 3.73 | 3.64 | 3.56 | 3.29 | 3.48 | 3.51 |
| $Na_2O$ | 2.70 | 1.01 | 2.57 | 2.52 | 1.00 | 2.66 | 2.62 | 2.74 | 2.65 | 2.71 | 2.59 | 2.66 | 2.71 | 2.80 | 2.74 | 2.53 | 2.67 | 2.70 |
| ZnO | — | — | — | 1.93 | — | — | | | | | | | — | 1.61 | 1.58 | 1.49 | 2.05 | 3.11 |
| $K_2O$ | — | 1.60 | — | — | 1.58 | — | | | | | | | | | | | | |
| CaO | — | — | — | — | 1.03 | 1.05 | 1.03 | 1.08 | 1.04 | 1.02 | 1.02 | 1.04 | 1.06 | — | — | — | — | — |
| SrO | | | | | | | 2.17 | 5.29 | — | — | — | — | | | | | | |
| BaO | 7.79 | 7.51 | 7.30 | 7.15 | 7.44 | 7.71 | 7.47 | — | 7.52 | 7.38 | 7.36 | 7.71 | 7.69 | 7.95 | 7.78 | 12.00 | 6.58 | 4.59 |
| $B_2O_3$ | 16.85 | 16.49 | 16.01 | 15.70 | 16.32 | 16.68 | 16.32 | 17.10 | 16.50 | 16.19 | 16.15 | 16.65 | 16.87 | 17.44 | 17.07 | 15.77 | 16.67 | 16.85 |
| $SiO_2$ | 53.11 | 52.00 | 50.47 | 49.49 | 51.47 | 52.55 | 51.46 | 53.89 | 52.01 | 51.71 | 50.92 | 48.50 | 53.87 | 49.82 | 48.80 | 49.72 | 52.56 | 53.11 |
| $Al_2O_3$ | 7.49 | 7.33 | 7.12 | 6.98 | 7.26 | 7.42 | 7.26 | 7.60 | 6.22 | 7.20 | 10.08 | 7.39 | 7.50 | 7.75 | 7.57 | 7.02 | 7.42 | 7.49 |
| $ZrO_2$ | 8.43 | 8.25 | 8.01 | 7.85 | 8.16 | 8.34 | 8.16 | 8.55 | 8.25 | 8.10 | 8.08 | 12.47 | 6.35 | 8.73 | 8.54 | 7.89 | 8.34 | 8.43 |
| $TiO_2$ | — | 2.16 | — | — | 2.14 | — | — | — | 2.16 | 2.12 | — | — | | | | | | |
| F | 3.77 | 3.72 | 3.58 | 3.51 | 3.68 | 2.49 | 3.65 | 3.82 | 3.69 | 4.89 | 3.61 | 3.73 | 3.77 | 3.90 | 3.82 | 3.53 | 3.73 | 3.77 |
| $Sb_2O_3$ | — | — | 4.92 | 4.83 | — | — | | | | | | | | | | | | |
| $SnO_2$ | | | | | | | | | | | | | | | — | 2.11 | — | — | — |
| Soft | 615 | 622 | 607 | 604 | 629 | 641 | 624 | 632 | * | * | 622 | 626 | 622 | 600 | 615 | 616 | 613 | 609 |
| Exp. | 58.1 | 58.4 | 60.2 | 60.0 | 57.6 | 58.5 | 60.1 | 58.5 | 59.7 | 62.3 | 58.5 | 60.4 | 59.7 | 60.7 | 59.7 | 61.0 | 56.8 | 55.9 |
| Acid | 2 | 1 | 1 | 1 | 1 | 1 | 3 | 2 | 1 | 1 | 4 | 3 | 3 | 3 | 3 | 3 | 3 | 3 |
| Alkali | 1 | 1 | 1 | 1 | 1 | 1 | 1 | 1 | 1 | 1 | 1 | 1 | 1 | 2 | 2 | 1 | 2 | 4 |

*Glass Devitrified

The firing of the cylinders causes the frit to melt and flow into the shape of a button. Those flow buttons were visually inspected for the quality of gloss and then subjected to tests to measure resistance to attack by acids and bases.

To secure a qualitative appraisal of the resistance of the frits to acids, the fusion buttons were immersed into an aqueous solution containing 4% by weight acetic acid operating at room temperature (22°±2° C.). After an immersion of 24 hours, the buttons were extracted from the bath and a visual evaluation made of the gloss utilizing the following rating system:

1=excellent, no change in gloss;
2=very good, barely perceptible loss of gloss;
3=good-to-fair, obvious visible loss of gloss; and
4=poor, heavy loss of gloss.

To qualitatively assess the resistance of the frits to alkali attack, particularly to attack by alkaline detergents such as are employed in commercial dishwashers, the following test was devised. The above-described fusion buttons were immersed into a 0.3% by weight aqueous solution operating at 96° C. of an alkaline detergent marketed by Economics Laboratories, St. Paul, The criticality of maintaining the composition within the stringently-defined limits of the invention is evident from an examination of the above table. Thus, Examples 1-22 demonstrate softening points between about 600°-625°, coefficients of thermal expansion (20°-300° C.) between about 57-62×10$^{-7}$/°C., and very good resistance to acids and alkalies. In contrast, Examples 23-36, which have compositions close to, but outside of, the stated ranges, do not exhibit properties coming within the desired ranges.

To ascertain the utility of the inventive frits with an actual substrate material, powdered frit of Examples 1 and 6 were blended with 10% by weight of four commercial pigments by hand mixing in a commercial screening oil, and the mixture silk screened onto the underside of 6.5" plates of CORELLE ® ware, a laminated glass tableware product marketed by Corning Glass Works, Corning, N.Y., having a coefficient of thermal expansion (0°-300° C.) of about 70×10$^{-7}$/°C. The pigments used, marketed by Ferro Corporation, Cleveland, Ohio, are listed below.

Ferro No. 1464 Yellow

Ferro No. 16200 Blue
Ferro No. K745 Black
Ferro No. V8845 Red

The first and last products are cadmium sulfoselenide pigments.

Two sets of samples were fired in a laboratory lehr; one set in ambient air and a second set in a nitrogen (inert) atmosphere. The samples were exposed above 775° C. for about 2.5 minutes, peaking at 795° C., and then cooled, but not quick chilled, to room temperature.

All the samples fired to a smooth homogeneous coating of good gloss in both air and nitrogen atmosphere and, unexpectedly, the red and yellow colorations were stable in both atmospheres, contrary to the situation described in U.S. Pat. No. 4,311,504. Thus, no discoloration thereof was observed in either firing.

Powdered frit of Example 8 was mixed with 10% by weight of two commercial cadmium-containing pigments in a commercial screening oil and the resultant enamels applied in the form of 0.25" wide bands onto 8" plates of CORELLE ® ware. The pigments used, marketed by Drakenfeld Colors, Washington, Pa., are listed below:

Drakenfeld No. 9505 yellow
Drakenfeld No. 9553 red

The plates were fired in air in a production lehr utilizing a top temperature of 775° C. The plates were exposed for about 20 seconds at that peak temperature and thereafter air chilled to room temperature.

The enamels exhibited excellent gloss and adhesion. After immersion for 72 hours in the Super Soilax detergent bath operating at 96° C. and 24 hours in the 4% acetic acid solution operating at room temperature, the cadmium release was less than 0.01 ppm Cd.

I claim:

1. A frit essentially free from cadmium and lead demonstrating good glass stability, a coefficient of thermal expansion (20°–300° C.) between about $58$–$62 \times 10^{-7}$/°C., a softening point between about 600°–625° C., and excellent resistance to attack by acids found in foods and to attack by alkaline detergents, said frit consisting essentially, expressed in terms of weight percent on the oxide basis, of $Li_2O$: 3–4
$Na_2O$: 0.75–3
$BaO$: 3.5–9.5
$B_2O_3$: 14–17.5
$Al_2O_3$: 6.75–8.75
$SiO_2$: 48–55
$ZrO_2$: 6.75–10.5
F: 3–4.

2. A frit according to claim 1 also containing up to 7.5% total of at least one metal oxide in the indicated proportion selected from the group of 0–3% $Bi_2O_3$, 0–1.5% $CaO$, 0–2% $K_2O$, 0–5% $Sb_2O_3$, 0–2% $SnO_2$, 0–2% $SrO$, 0–3% $TiO_2$, and 0–2.5% $ZnO$.

* * * * *